United States Patent [19]

Gunther

[11] 4,063,576

[45] Dec. 20, 1977

[54] HEAT TREATMENT OF $NiO_x$ UTILIZED IN PRESSED NICKEL ELECTRODES

[75] Inventor: Ronald G. Gunther, Mystic, Conn.

[73] Assignee: Yardney Electric Corporation, Pawcatuck, Conn.

[21] Appl. No.: 717,859

[22] Filed: Aug. 26, 1976

[51] Int. Cl.$^2$ .............................................. B65B 1/04
[52] U.S. Cl. ......................................... 141/1.1; 141/11
[58] Field of Search ................... 252/182.1; 29/623.5; 204/2.1; 429/223; 141/1.1, 32, 33, 1, 11, 82

[56] References Cited

U.S. PATENT DOCUMENTS 2,727,081  12/1955  Solomon et al. ..................... 141/1.1
3,888,695  6/1975  Catherino ............................ 204/2.1

FOREIGN PATENT DOCUMENTS 2,407,030  8/1974  Germany ............................. 429/223

*Primary Examiner*—Houston S. Bell, Jr.
*Attorney, Agent, or Firm*—Donald E. Nist

[57] ABSTRACT

An improvement in the discharge capacity of pressed nickel electrodes which comprise a $NiO_x$/Co/binder admixture pressed into a current collector is obtained by heating the $NiO_x$ to a temperature on the order of 125° C. to 175° C. either before or after incorporating the $NiO_x$ in the electrode.

12 Claims, 1 Drawing Figure

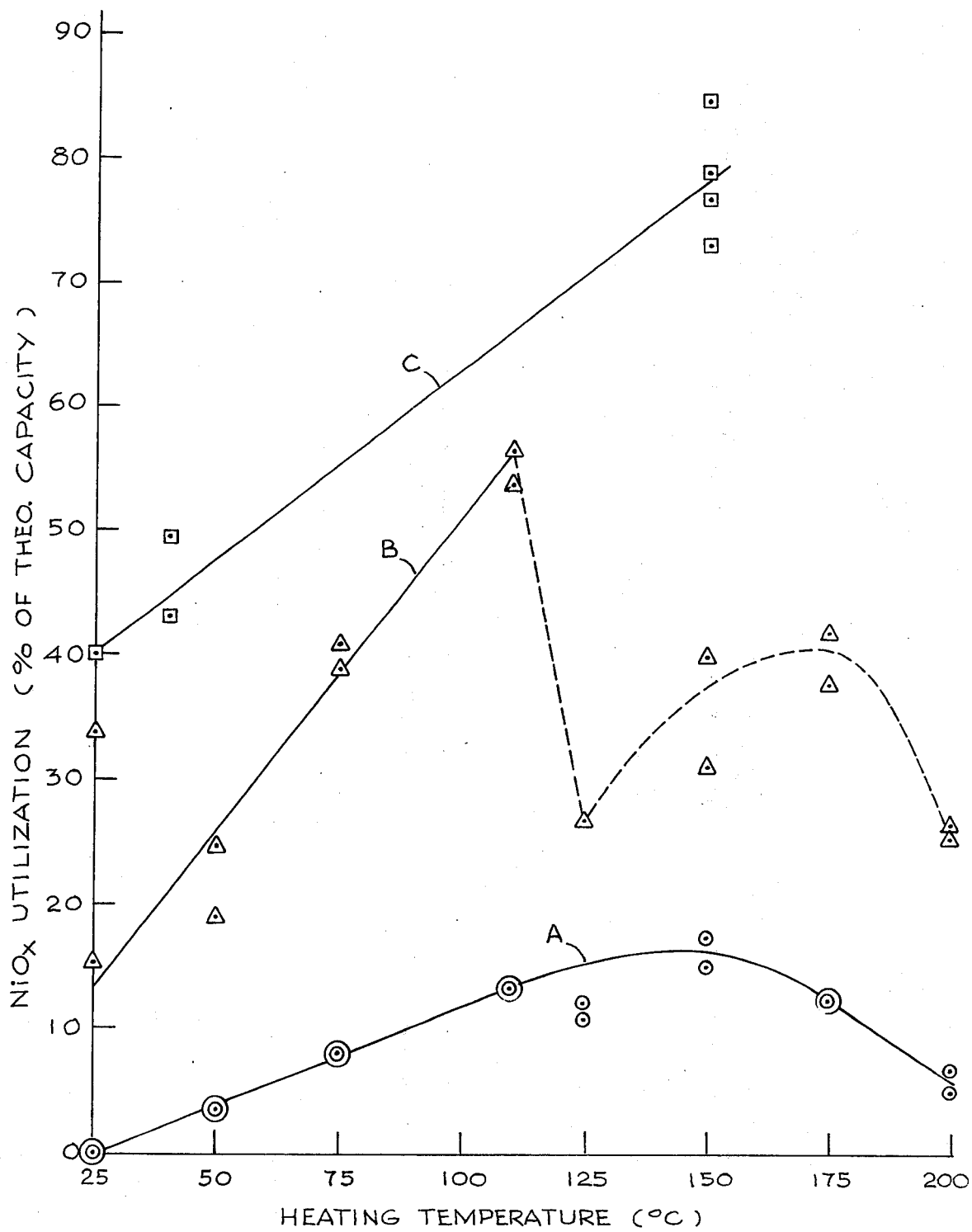

HEAT TREATMENT OF NiO$_x$ UTILIZED IN PRESSED NICKEL ELECTRODES

BACKGROUND OF THE INVENTION

This invention relates to pressed nickel electrodes and, more particularly, to such electrodes which utilize NiO$_x$ as the active electrode material.

Heretofore, pressed nickel electrodes have been made by pressing a mixture of active electrode material and binder (and other electrode constituents such as conductive diluents if desired) into the openings of an apertured current collector. The active electrode material may be NiO$_x$, which is a berthollide, i.e., $x$ is not an integer. A particularly useful NiO$_x$ compound contains about 55% nickel by weight and x has a value between about 1.65 and 1.8. In order to obtain optimum charge acceptance, it has been known to include a cobalt-containing compound with the NiO$_x$. The cobalt-containing compound may be present in a form such as cobalt hydroxide (Co(OH)$_2$), or it may be present in the form of CoO$_x$ which is analogous to the NiO$_x$.

Although electrodes formed as described produce satisfactory results in cells such as nickel/iron, nickel/zinc, nickel/hydrogen and nickel/cadmium cells, such cells have to be "formed" by repeated charge/discharge cycling of the cell in order to realize a substantial percentage of the theoretical cell capacity.

SUMMARY OF THE INVENTION

Pressed nickel electrodes are assembled as described in the prior art. However, a novel step of heating the NiO$_x$ either before of after it is incorporated in the electrode is employed. An improvement is obtained by heating the NiO$_x$ to a temperature in the range between about 125° C. and about 175° C. for a time sufficient to produce the desired result.

By utilizing NiO$_x$ which has been heated as described above in a pressed nickel electrode, a substantially higher percentage of theoretical discharge capacity at ambient conditions is realized from cells which utilize such electrodes as compared with similar cells incorporating pressed nickel electrodes utilizing NiO$_x$ which has not been heated.

DESCRIPTION OF THE DRAWING

The FIGURE is a plot of NiO$_x$ Utilization (% theoretical capacity) vs. Heating Temperature and graphically illustrates the benefits derived from utilizing heated NiO$_x$ in (positive) nickel electrodes.

DESCRIPTION OF THE PREFERRED EMBODIMENT

The pressed nickel electrode described herein is made by pressing an active nickel electrode material admixture into the openings in an apertured lightweight current collector. The active electrode material admixture comprises at least the active electrode material and a binder to bind the latter to the current collector at the pressures employed to fabricate the electrode. Other components such as conductive diluents and pore formers may also be included in the admixture.

The active electrode material is NiO$_x$ in combination with a cobalt-containing compound. The latter can be a compound such as Co(OH)$_2$ or it can be CoO$_x$. These materials are combined with a binder such as polytetrafluoroethylene to make up the active electrode material admixture.

The NiO$_x$ is formed by chemical oxidation of a nickel-containing salt in alkaline media as is well known. The nickel-containing salt may be nickelous nitrate (Ni(NO$_3$)$_2$), nickel sulfate (NiSO$_4$), nickel chloride (NiCl$_2$) or nickel bromide (NiBr$_2$).

Although sodium hypochlorite is preferred as the oxidant, other oxidants such as potassium hypochlorite and bromine gas can be used.

The alkaline media are made by dissolving a strong base in water. Various strong bases such as potassium hydroxide, lithium hydroxide and sodium hydroxide can be used although it is preferred to use a combination of sodium and lithium hydroxides.

If CoO$_x$ is used as the cobalt-containing compound, it is formed in essentially the same way as the NiO$_x$ from its corresponding salts, e.g., cobaltous nitrate.

Rather than form the NiO$_x$ and CoO$_x$ separately (when they are used together), salts of those compounds can be chemically co-oxidized and the resulting NiO$_x$ and CoO$_x$ co-precipitated as a black powder in which the CoO$_x$ is relatively uniformly dispersed in the NiO$_x$.

To produce the NiO$_x$, a nickelous salt solution is first made up. This solution is made by dissolving the nickelous salt concentration between about 0.17 and 2 molar.

An aqueous oxidant/base solution is made utilizing the constituents described hereinbefore by adjusting the base and oxidant concentrations so that they lie between about 2 and 6.5 molar and about 0.34 and 1 molar, respectively.

Particular concentrations and quantities of the two separate solutions of the nickelous salt, oxidant and base components are employed within the previously disclosed concentration ranges for these components such that the mole ratio of the nickelous salt to oxidant in the final solution when the two solutions are mixed together is preferably between about 1:2 to about 1:8 and so that the mole ratio of the nickelous salt to base is between about 1:2 and about 1:150.

After the nickelous salt and the oxidant/base solutions have been made up, they are combined to provide the reactive salt/oxidant solution. The addition of these two solutions to each other is made by adding the nickelous salt solution slowly with stirring to the oxidant/base solution preferably over a period of about one hour. The resulting NiO$_x$ precipitate is then collected, washed and dried at approximately 40°–50° C.

The CoO$_x$ can be made in substantially the same way as the NiO$_x$ using substantially the same concentration ranges and ratios as noted herein with respect to the NiO$_x$. Preferably, the CoO$_x$ is co-precipitated with the NiO$_x$ by adding a soluble cobalt salt to the nickel salt solution in quantity such that the Ni:Co weight ratio in the coprecipitated NiO$_x$ plus CoO$_x$ powder is between about 9:1 and about 9.8:0.2 in the preferred formulation.

To form a pressed nickel electrode, the NiO$_x$ is combined with a cobalt-containing compound such as Co(OH)$_2$ or CoO$_x$ in relative proportions to provide a preferred Ni:Co ratio of between about 9:1 and about 9.8:0.2. These materials are then combined with a suitable binder such as polytetrafluoroethylene and any other desired nickel electrode components such as graphite for improving internal electrode conductivity. The resulting active electrode material/binder admixture is pressed into the openings in an apertured current collector, e.g., an expanded nickel sheet, at pressures on the order of 8,000 to 20,000 psi to produce the completed electrode.

To provide the improvement in electrode performance obtainable from the herein-described nickel electrodes, the dried $NiO_x$ utilized in the nickel electrode is heated to a temperature within the range between about 125° C. and about 175° C. for at least about 15 minutes and preferably about two hours. It has been found that heating can be continued for substantially longer times with about the same improvement in performance as that which is observed after about two hours at the same temperature. For example, tests were conducted in which the $NiO_x$ was heated for two hours in one test and 66 hours in another test. The same results were observed in both cases. In view of these tests, it will be understood that it is preferable to heat the $NiO_x$ for a short period which is just sufficient to provide the improved results.

The $NiO_x$ may be subjected to the foregoing heating step either before it is incorporated into the electrode, after it is incorporated into the electrode, or both before and after it is incorporated into the electrode. However, if the cobalt is present in the form of, for example, $Co(OH)_2$, rather than the $CoO_x$, the $NiO_x$ must be heated prior to mixture with the $(Co(OH)_2$ since the latter breaks down in the 125° C. – 175° C. temperature range with an adverse effect on the nickel electrode performance.

This invention will now be further described by the following Example.

EXAMPLE

Two sets of nickel/cobalt electrodes were made as follows. The first set was made from a mix having the following composition: 81 wt.% $NiO_x$, 7 wt.% $Co(OH)_2$, 5 wt.% graphite, 5 wt.% nickel flake, 2 wt.% polytetrafluoroethylene. The second set was made from a mix having the following composition: 79 wt.% $NiO_x$, 9 wt.% $CoO_x$, (coprecipitated from an aqueous LiOH (0.49 molar)/NaOH (2.5M) solution initially containing nickel nitrate (1.4M) and cobalt nitrate (0.16M) together with 1M sodium hypochlorite), 5 wt.% graphite, 5 wt.% nickel flake, 2 wt.% polytetrafluoroethylene. In each case, the mix was applied to an expanded metal current collector and was pressed at approximately 12,000 psi to make a finished electrode.

Prior to assembly into a cell, the finished electrodes were put into an oven and were held at a prescribed temperature for two hours. Some electrodes were heated at 50° C., others at 75° C., etc. on up to 200° C. as shown in the FIGURE. After the heat treatment, the electrodes were cooled to room temperature, were assembled into individual cells utilizing nickel plaque counter electrodes and aqueous NaOH/LiOH electrolyte and then were cycled (discharged/charged).

Because the $NiO_x$, and to a much lesser extent the cobalt-containing constituents, have some intrinsic electrochemical capacity, the cells were first discharged to 0.55 volts measured against a cadmium reference prior to being charged electrochemically.

The discharge capacity of the chemically oxidized $NiO_x/Co(OH)_2$ and $NiO_x/CoO_x$ during this initial discharge is given in the FIGURE (Curve A) along with the discharge capacity of the electrochemically oxidized $NiO_x/Co(OH)_2$ and $NiO_x/CoO_x$ electrodes (Curves B and C, respectively) after the first electrochemical charging of the cells. It will be noted that the discharge capacity during the initial discharge of the chemically oxidized $NiO_x$ (Curve A) reaches a maximum in the 125°–175° C. range. Similarly, examination of Curve B for the discharge of the electrochemically oxidized $NiO_x + Co(OH)_2$ cells reveals that although a discontinuity in the data occurs at 125° C. due to $Co(OH)_2$ decomposition, the electrodes heated to temperatures in excess of 125° C. have a capacity peak in the 150°–175° C. range (dashed region). Although there is an improvement in nickel electrode performance by a heat treatment in the temperature range between 25° C. and 125° C., the temperature range between 125°–175° C. is preferred because the maximum capacity of the electrode is obtained by heating in this range when the unstable $CO(OH)_2$ compound is absent. This is illustrated by the capacity obtained from the $NiO_x + CoO_x$ electrodes which were heated to 150° C., as is shown by Curve C. The $CoO_x$ is stable toward thermal decomposition at these temperatures, so optimum performance can be obtained by heating into the 125°–175° C. temperature range.

Results similar to those shown in the FIGURE are obtained when the $NiO_x$ or the $NiO_x + CoO_x$ are heated in the preferred temperature range and then stored at room temperature prior to making up the mixes for electrodes. It has been found that the initial discharge of the chemically oxidized capacity will deteriorate with time during this dry storage period, but that the enhanced capacity of the nickel electrode due to the heat treatment will still be obtained from the electrodes after the first electrochemical charging in the finished cell.

The benefits obtained from heating the $NiO_x$ to a temperature within the temperature range of 125° – 175° C., as compared with not heating the $NiO_x$, can be seen from the FIGURE by comparing that portion of each of Curves A, B and C within the aforementioned temperature range to the ordinate values (25° C) on the same Curve which represent no heating of the $NiO_x$. In each case, it will be noted that heating of the $NiO_x$ substantially improves the discharge performance of both the chemically and electrochemically oxidized $NiO_x$.

I claim:

1. The method of making an improved pressed nickel electrode, said method comprising forming a dry admixture of the berthollide $NiO_x$ as the active electrode material, and a binder therefor, and pressing said admixture into a current collector, said method including the step of: heating said $NiO_x$ at a temperature between about 125° C. and about 175° C. for at least about 15 minutes.

2. The method of claim 1 wherein said $NiO_x$ is heated at said temperature prior to its incorporation into said nickel electrode.

3. The method of claim 1 wherein said $NiO_x$ is heated at said temperature after its incorporation into said electrode.

4. The method of claim 1 wherein said $NiO_x$ is heated at said temperature for a period between about 15 minutes and about 2 hours.

5. The method of claim 1 wherein said berthollide $NiO_x$ contains about 55% by weight nickel and $x$ has a value between about 1.65 and about 1.8.

6. The method of making an improved pressed nickel electrode comprising forming a dry admixture of the berthollide $NiO_x$, a cobalt-containing member of the group consisting of the berthollide $CoO_x$ and $Co(OH)_2$ and a binder therefor, and pressing said admixture into a current collector, said method including the step of: heating said $NiO_x$ at a temperature between about 125°

C. for at least about 15 minutes without decomposing said Co(OH)$_2$.

7. The method of claim 6 wherein said NiO$_x$ is heated at said temperature before admixture with said cobalt-containing member.

8. The method of claim 6 wherein said NiO$_x$ is heated at said temperature after admixture with said cobalt-containing member and said member in said CoO$_x$.

9. The method of claim 6 wherein said NiO$_x$ is heated at said temperature for about 15 minutes to about 2 hours.

10. The method of claim 6 wherein said NiO$_x$ contains about 55% by weight nickel and $x$ has a value between about 1.65 and about 1.8.

11. A pressed nickel electrode made according to the method of claim 1.

12. A pressed nickel electrode made according to the method of claim 6.

* * * * *